3,660,330
AQUEOUS ELECTRODIPPING LACQUER
COMPOSITIONS
Rolf Dhein, Krefeld-Bockum, Hans-Jurgen Meibner, Krefeld, and Hermann Schnell, Krefeld-Uerdingen, Germany, assignors to Farbenfabriken Bayer Aktiengesellschaft, Leverkusen, Germany
No Drawing. Filed May 9, 1969, Ser. No. 823,494
Claims priority, application Germany, June 7, 1968,
P 17 69 545.3
Int. Cl. C09d 3/64, 3/72, 5/24
U.S. Cl. 260—22 TN                 9 Claims

ABSTRACT OF THE DISCLOSURE

The invention relates to aqueous electrodipping lacquer compositions comprising water-dissolved amine salts of alkyd resin semi-esters of tetrahydrophthalic acid or its homologues, said alkyd resin semi-esters being modified with saturated fatty acid radicals and with cross-linking N-alkoxymethyl groups and phenol and/or alkylphenols.

---

The present invention relates to aqueous electrodipping lacquer compositions based on water-dissolved amine salts of alkyd resin semi-esters of tetrahydrophthalic acid or its homologues, which are modified with saturated fatty acid radicals, such as have been described, for example, in the published particulars of Belgian patent specification No. 682,926, but with improved properties.

These known lacquer compositions, to which preferably aminoplasts are added, lead to lacquer films with especially high gloss When coating iron, however, these coatings are markedly discoloured after oven-drying. They are, therefore, less suitable for the production of white and light-coloured lacquer coatings on iron. Furthermore, it may occur that the components of these lacquer compositions are not electrodeposited in a constant proportion so that films of an uneven composition are formed.

The object of the invention comprises aqueous electrodipping lacquer compositions based on water-dissolved amine salts of alkyd resin semi-esters of tetrahydrophthalic acid or its homologues, such as alkyl- and endomethylene-tetrahydrophthalic acid, and modified with saturated fatty acid radicals, which do not possess the above-mentioned disadvantages, but which yield thick and hard coatings with a high degree of gloss and whiteness and are, therefore, especially suited for the production of white and light-coloured, oven-drying, one-layer lacquer coatings particularly on iron. They are characterised in that they contain alkyd resin semi-esters containing cross-linking N-alkoxymethyl groups, so-called "Mannich groups," and phenol and/or alkylphenols.

The alkyd resin semi-esters modified with N-alkoxymethyl groups should have a hydroxyl number between 0 and about 140, and an acid number between about 35 and about 80. However, hydroxyl numbers are preferred between about 50 and about 100 and acid numbers between about 40 and about 70, with a molar ratio of polycarboxylic acid to polyalcohol radicals in the alkyd resins prior to their conversion into the semi-esters of about 1:1 to about 1:1.25, since lacquer films can thus be deposited from the lacquer compositions with the application of high voltages of about 140 to about 300 volts. If this molar ratio lies above about 1:1.25, then there can also be deposited from the lacquer compositions with the application of lower voltages of less than about 140 volt, good lacquer films, whereas the application of higher voltages leads to spongy deposits.

Polycarboxylic acids suitable for the preparation of the alkyd resins are the following, for example, phthalic acid, isophthalic acid, tetrahydrophthalic acid, hexahydrophthalic acid, adipic acid and maleic acid or the corresponding anhydrides.

Suitable alcohols are, for example, glycerol, trimethylol ethane, trimethylol propane, pentaerythritol, dipentaerythritol, mannitol and sorbitol. Diols, such as ethyleneglycol, di- and polyglycols, propanediols, butanediols, hexanediols, 2,2 - bis - (4 - hydroxycyclohexyl)-propane and 2,2 - bis - (4 - β - hydroxy - alkoxyphenyl) - alkanes may proportionately be used concurrently. The concurrent use of aminoalcohols, such as triethanolamine, is also possible.

Suitable fatty acids are natural or synthetic saturated fatty acids, such as caproic acid, caprylic acid, pelargonic acid, caprinic acid, coconut oil fatty acid, natural and synthetic once-run fatty acids ($C_{9-11}$), lauric acid, palmitic acid, stearic acid, saturated dimerized fatty acids as well as branched fatty acids obtained from the fatty acid synthesis according to Koch. The use of hydroxycarboxylic acids, e.g. of lactic acid and hydroxystearic acid, is also possible. Monocarboxylic acids, such as benzoic acid and p-tertiary butylbenzoic acid may also be used concurrently.

The N-alkoxymethyl groups are expediently incorporated into the alkyd resin semi-esters by reacting the semi-esters with alkoxymethyl-isocyanates according to the process of German patent specification No. 1,244,410.

100 parts by weight of the resins so obtained should preferably contain about 0.09 to about 0.15 mol N-alkoxymethyl groups, but this content may be higher or lower.

Suitable alkoxymethyl - isocyanates are, for example, methoxy-, ethoxy-, n-propoxy-, iso-propoxy-, n-butoxy- and iso-butoxymethyl-isocyanate.

For the salt formation with the semi-esters aqueous ammonia solutions or, for example, aqueous dimethyl- and trimethylamine solutions may be used as well as ethyl-, diethyl- and triethylamine, propyl- and butylamine, ethanol-, di- and tri-ethanolamine and also N-methyl-, N,N-dimethyl-ethanolamine and morpholine.

It is not always necessary to use the quantity of amines theoretically required for neutralising the carboxyl groups. A sufficient water-dilutability is frequently achieved with smaller amounts of amine. However, the pH value of the aqueous compositions should generally lie between about 7.5 and 8.5, measured with the glass electrode, since within this range especially smooth and dense lacquer coatings are obtained.

The salt formation may take place in organic solvents in the solutions of the semi-esters originating from their production, but expediently after pasting these solutions with pigments and with fillers, if desired.

The lacquer pastes are then diluted with distilled water, optionally with the concurrent use of water-miscible and/or partially water-miscible solvents, such as methanol, ethanol, propanol, isopropanol, diethylene glycol, ethylene glycol-monomethyl, -ethyl and -butyl ether, dimethyl formamide, and ketones, e.g. cyclohexanone, to give compositions with a solid content of about ½ to about 20%, preferably 8 to 15%.

To attain thick lacquer coatings with a high degree of gloss and whiteness, the lacquer compositions according to the invention finally also contain phenol and/or an alkylphenol, such as cresol, o- or p-tertiary butylphenol, or a xylenol Such a phenol may already be added to the solutions, as are obtained after the reaction of the semi-ester with alkoxymethyl-isocyanate, or later to the lacquer pastes or the dilute lacquer compositions which are already ready for further processing.

The phenol content of the lacquer compositions should lie between about 1 and about 10 parts by weight, preferably between about 3 and about 6 parts by weight, per 100 parts by weight of cross-linking alkyd resin. The degree of whiteness and gloss of the lacquer coatings is progressively improved with the phenol content increasing up to about 6 parts by weight phenol per 100 parts by weight resin, and likewise the attainable layer thickness of the film. When the compositions contain more than about 6 parts by weight phenol per 100 parts by weight resin, essentially only the attainable layer thickness of the lacquer coatings is increased. When, on the other hand, the phenol content of the compositions lies below the above-mentioned minimum limit, the advantages of the new compositions are lost.

The coatings which are deposited from the lacquer compositions by the electric current harden at about 140° C. to about 160° C. to yield firmly adhering, glossy and water-resistant lacquer films.

The lacquer compositions can also be used without pigments. In contrast to phenol-free lacquers, they yield in this case coatings on iron, which are not discoloured after oven-drying.

The parts given in the example are parts by weight.

EXAMPLE

From pentaerythritol, phthalic anhydride and a natural once-run fatty acid, an alkyd resin is prepared at 220° C. which contains 34.6 percent by weight phthalic anhydride and 40.1 percent by weight natural once-run fatty acid, has an acid number of about 5.9, and its 60% solution in dimethyl formamide possesses an outflow time of about 70 seconds in the viscosimetric cup according to 4 DIN 53, 211. 4588 parts of this resin and 838 parts tetrahydrophthalic anhydride are heated at 150° C. until an acid number of 63 is reached and the outflow time of a 40% solution in xylene is about 78 seconds in the viscosimetric cup according to 4 DIN 53,211.

The resin is then dissolved in 1899.3 parts dimethyl formamide and mixed, after the addition of 176.9 parts triethylamine, at 50° C. within 2 hours with 472.1 parts methoxymethyl-isocyanate, and the solution is stirred at 50° C. until free isocyanate can no longer be detected.

A lacquer paste is prepared from 411.5 parts of the resin solution obtained, 12.02 parts triethylamine, 30.8 parts ethylene glycol monobutyl ether and 152 parts of a finely dispersed titanium dioxide.

350.7 parts of this paste are diluted with 2289.3 parts of an aqueous solution of 8.8 parts phenol and 2280.5 parts distilled water. This lacquer composition has a pH value [1] of about 8.1 and an electric resistance [2] of about 1022Ω cm. This composition is filled into a steel basin 10 cm. wide, 19.5 cm. long and 17 cm. high which is provided with 2 glass stirrers and operated as cathode. At a bath temperature of 30° C. and a constant voltage of 160 volts a steel sheet, which is operated as anode and is 6.5 cm. wide, 11.0 cm. long and 0.5 mm. thick, is coated for 2 minutes, while stirring, and a water-insoluble coating is thus formed on the steel sheet which is then stoved at 150° C. for 30 minutes. The finished lacquer coating has a layer thickness [3] of 27μ, a degree of gloss [4] of 62.5 and of whiteness [5] of 71.

---

[1] pH value: measured with the glass electrode at 30° C.
[2] Electric resistance: measured at 30° C. with the conductivity testing device of type LBR of "Wissenschaftlich-Technische Werkstaetten GmbH (WTW)."
[3] Layer thickness: measured with Permaskop ES by Fischer.
[4] Gloss degree: measured at 60° C. according to ASTM D 523–62 T.
[5] Whiteness degree: measured with Elrepho (Zeiss) against MgO.

In a comparative experiment in which the procedure is the same, but in which the electro-dipping lacquer composition was obtained, without the phenol addition, by diluting 350 parts of the lacquer paste with only 2289 parts distilled water, the finished lacquer film has a thickness of only 18.5μ, the degree of gloss amounts to only 50 and the whiteness degree is only 61.2.

We claim:

1. An aqueous electrodipping lacquer composition comprising an aqueous solution of (1) an amine salt of an alkyd resin semi-ester of tetrahydrophthalic acid or a homolog of said acid, said alkyd resin semi-ester being modified with saturated fatty acid radicals and with cross-linking N-alkoxymethyl groups and (2) phenol, an alkylphenol or a mixture thereof, there being from about 1 to about 10 parts by weight of (2) per 100 parts by weight of (1) and the solid content of said lacquer composition being from about ½ to about 20% by weight.

2. Compositions according to claim 1, wherein the alkyd resin semi-ester has a hydroxyl number between 0 and about 140 and an acid number between about 35 and about 80.

3. Compositions according to claim 2, wherein the alkyd resin semi-ester has a hydroxyl number between about 50 and about 100 and an acid number between about 40 and about 70.

4. Compositions according to claim 1, wherein the molar ratio of polycarboxylic acid to polyalcohol radicals in the alkyd resin prior to its conversion into the semi-ester amounts from about 1:1 to about 1:1.25.

5. Compositions according to claim 1, wherein the N-alkoxymethyl groups are incorporated into the alkyd resin semi-ester by reaction of the semi-ester with an alkoxymethyl-isocyanate.

6. Compositions according to claim 1, wherein the amounts of N-alkoxymethyl groups of the alkyd resin semi-ester yields from about 0.09 to about 0.15 mol per 100 parts by weight of the resin semi-ester.

7. Compositions according to claim 1, wherein the solid content of the lacquer composition amounts from about 8 to about 15% by weight.

8. Compositions according to claim 1, wherein the pH value of the aqueous composition lies between about 7.5 and about 8.5.

9. Compositions according to claim 1, wherein the phenol content of the lacquer composition lies between about 3 and about 6% by weight.

References Cited

UNITED STATES PATENTS

| | | | |
|---|---|---|---|
| 3,493,483 | 2/1970 | Gacesa | 204—181 |
| 3,384,606 | 5/1968 | Dieterich et al. | 260—29.4 |
| 3,434,987 | 3/1969 | Dhein et al. | 260—21 |
| 3,477,977 | 11/1969 | Schnell et al. | 260—22 |

FOREIGN PATENTS

| | | | |
|---|---|---|---|
| 682,926 | 12/1966 | Belgium | 260—22 |
| 1,019,658 | 2/1966 | Great Britain | 204—181 |
| 1,244,410 | 7/1967 | Germany | 260—21 |

DONALD E. CZAJA, Primary Examiner

R. W. GRIFFIN, Assistant Examiner

U.S. Cl. X.R.

117—132 R, 161 K, 161 KP; 204—181; 260—22 R, 29.2 E